Sept. 19, 1961 T. T. COUEY 3,000,133
FISHING APPARATUS
Filed Oct. 16, 1959 2 Sheets-Sheet 1

INVENTOR.
TOM T. COUEY
BY
McMorrow, Berman & Davidson
ATTORNEYS

Sept. 19, 1961 T. T. COUEY 3,000,133
FISHING APPARATUS
Filed Oct. 16, 1959 2 Sheets-Sheet 2
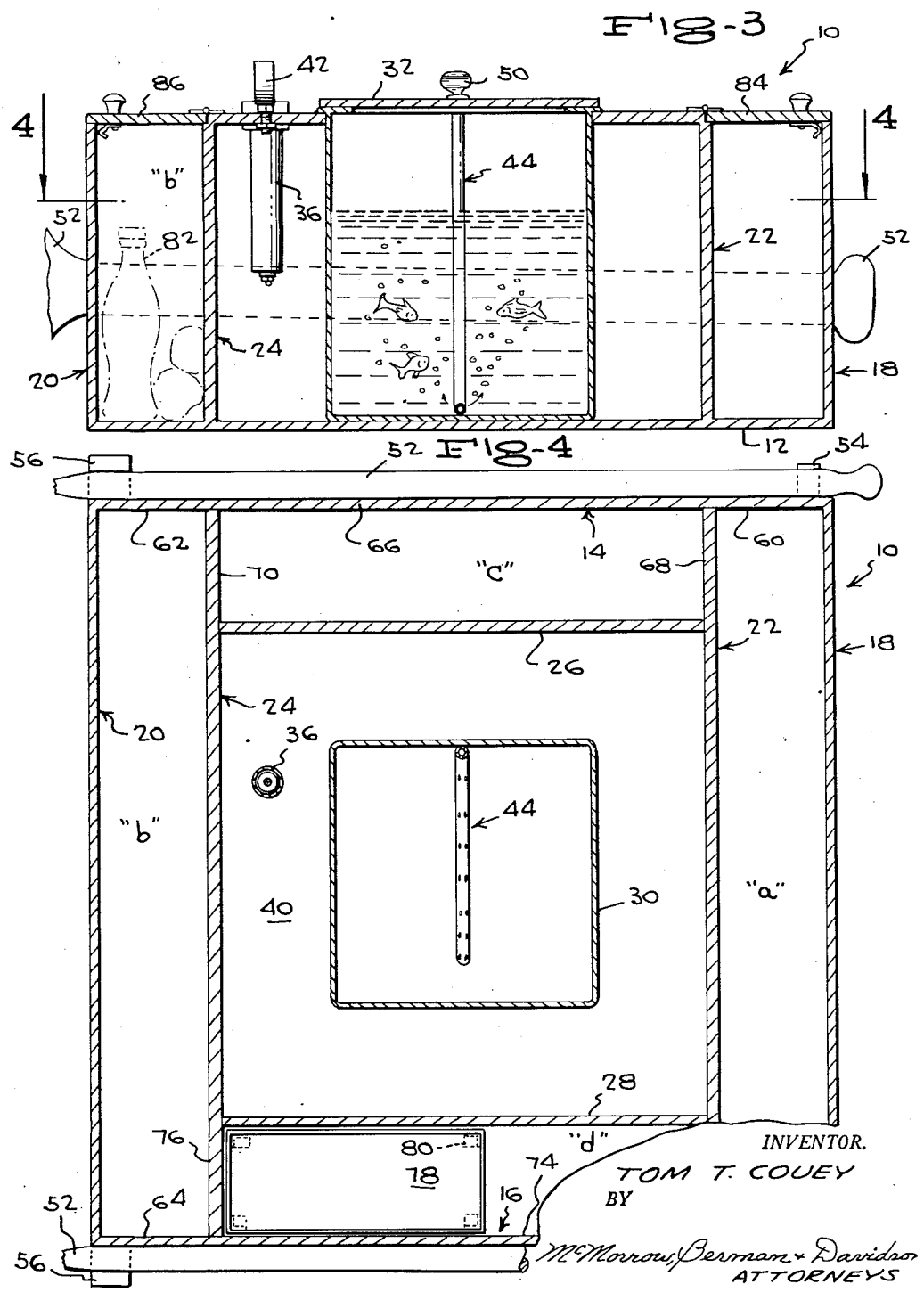
INVENTOR.
TOM T. COUEY
BY
McMorrow, Berman & Davidson
ATTORNEYS United States Patent Office 3,000,133
Patented Sept. 19, 1961

3,000,133
FISHING APPARATUS
Tom T. Couey, P.O. Box 1147, Rosedale, Miss.
Filed Oct. 16, 1959, Ser. No. 846,994
3 Claims. (Cl. 43—57)

The present invention relates to fishing apparatus designed to store all of the paraphernalia, food, and other appurtenances of a fisherman.

A fisherman on a fishing trip desires or requires a considerable number of articles to accompany him. He needs food, iced beverages, smoking equipment, tackle and lures, bait in live condition, and other appurtenances. The storage and transport of the many separate articles presents a problem.

An object of the present invention is to provide a fishing apparatus which has storage space for live bait, means for keeping the live bait in healthy condition, storage space for food, water, boat paddles, artificial lures, and the like.

Another object of the present invention is to provide a fishing apparatus which is compact in size, one easily lifted into and out of a vehicle, one easily carried over a ground surface, and one which is economically feasible.

These and other objects and advantages of the present invention will be fully apparent from the following description when taken in conjunction with the annexed drawings, in which:

FIGURE 3 is a view taken on the line 3—3 of FIGURE 2; and

FIGURE 4 is a view taken on the line 4—4 of FIGURE 3, a portion of the apparatus being broken away.

Figure 1:
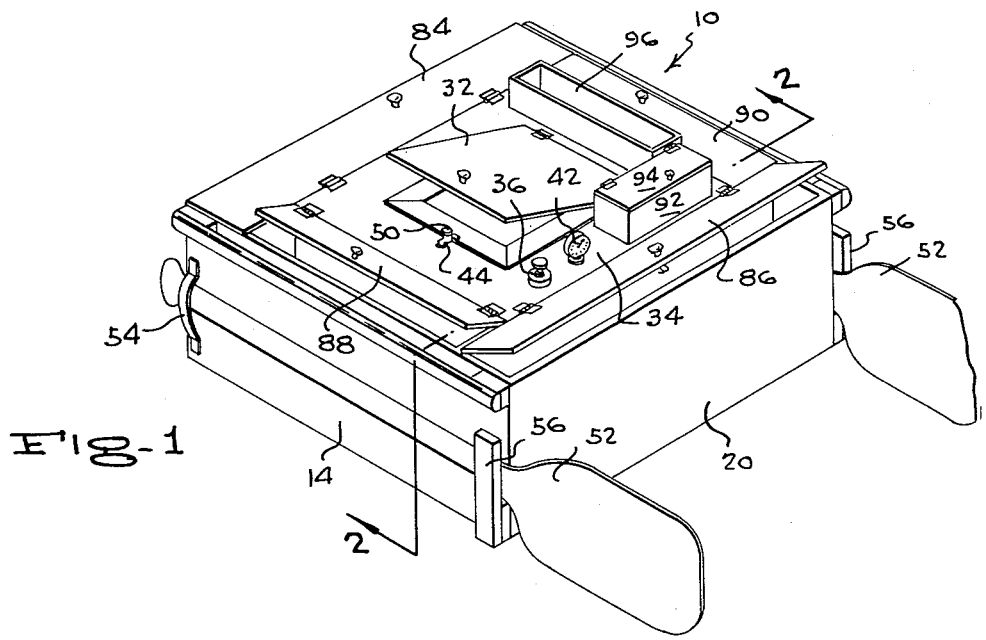
FIGURE 1 is an isometric view of the apparatus according to the present invention.

Referring in greater detail to the drawings in which like numerals indicate like parts throughout the several views, the fishing apparatus of the present invention comprises an open top box 10 having a floor 12, a pair of side walls 14 and 16 rising from the side edges of the floor 12, an end wall 18 rising from one end edge of the floor 12 and connecting adjacent ends of the side walls 14 and 16 together, and another end wall 20 also rising from the floor 12 along the other end edge and connecting the other adjacent ends of the side walls 14 and 16 together.

A first upstanding main partition is positioned within the box 10 inwardly of and parallel to and spaced from the end wall 18 and extends from the side wall 14 to the side wall 16, as shown in FIGURE 4, said first main partition being designated by the reference numeral 22.

A second upstanding main partition 24 is positioned within the box 10 inwardly of and parallel to and spaced from the end wall 20 and extends from the side wall 14 to the side wall 16.

A first upstanding auxiliary partition 26 is positioned within the box 10 inwardly of and parallel to and spaced from the side wall 14 and extends from the first main partition 22 to the second main partition 24.

A second upstanding auxiliary partition 28 is positioned wtihin the box 10 inwardly of and parallel to and spaced from the side wall 16 and extends from the first main partition 22 to the second main partition 24.

A tank 30, having an open top and a cover 32 extending over the open top, is fixedly positioned within and spaced from the partitions 22, 24, 26, and 28.

A top 34 extends over the space between the tank 30 and the partitions 22, 24, 26, and 28, and together with the tank 30, the aforementioned partitions, and the adjacent portions of the floor 12 forms an enclosure for the storage of air under pressure.

Figure 2:
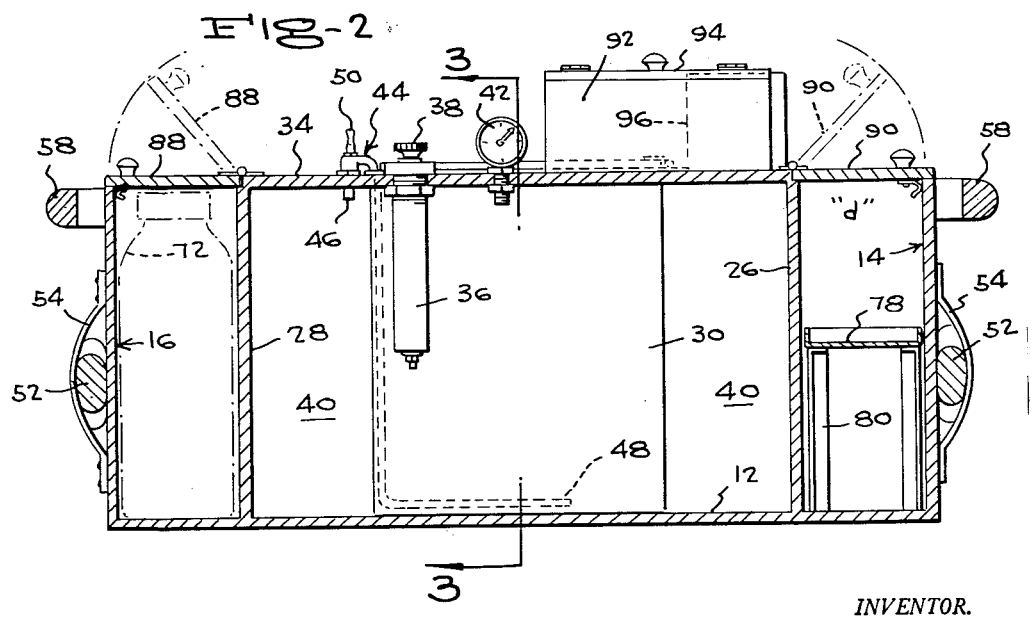
FIGURE 2 is a view on an enlarged scale, taken on the line 2—2 of FIGURE 1.

A vertically disposed pump 36, having a handle 38 on its plunger, is positioned with the handle 38 exteriorly of and above the enclosure formed by the tank 30 and the partitions 22, 24, 26, and 28. The enclosure, designated in FIGURE 2 by the reference numeral 40, is in the form of a hollow square. The pump 36 is suspended in the enclosure top 34, as shown most clearly in FIGURE 2.

Also, extending into the enclosure 40 is a gauge 42 for measuring the pressure of the air contained within the enclosure 40.

Conduit means, embodying a pipe 44, has one end 46 within the enclosure 40 and the other end 48 within the tank 30 for connecting the interior of the enclosure 40 with the interior of the tank 30. A valve 50 is in the pipe 44 in that portion of the pipe 44 which extends above the top 34 and serves to control and limit the flow of air from the enclosure 40 to the tank 30.

Suspension means is provided exteriorly of and carried by each of the box side walls 14 and 16 for the support of a paddle 52 thereon. This suspension means consists in a loop element 54 at one end of each of the side walls 14 and 16 and a hook element 56 at the other end.

On each of the side walls 14 and 16 adjacent the upper end thereof is a handle structure 58 extending from one end to the other end of such side wall.

The space between the first main partition 22, the adjacent end wall 18, and the portions 60 of the box side walls 14 and 16 between the end wall 18 and the partition 22 form a storage compartment for storing ice and beverages to be iced, the end portion of the side wall 16 not being shown in FIGURE 4.

The space between the second main partition 24, the end wall 20, and the adjacent side wall end portions 62 and 64 form a second storage compartment, also suitable for storing of ice and beverages to be iced.

The space between the first auxiliary partition 26, the adjacent portion 66 of the adjacent side wall 14, and the adjacent parts 68 and 70 of the first and second main partitions, respectively, forms a third storage compartment. This compartment is suitable for storing therein water or other liquids in separate containers, one such container being shown in dotted lines in FIGURE 2 and designated by the numeral 72.

The space between the second auxiliary partition 28, the adjacent portion 74 of the side wall 16, and the adjacent portions 76 of the first and second main partitions 22 and 24 form a fourth compartment suitable for the storage therein of food, the portion 76 of the first main partition 22 not being shown.

In FIGURE 4, the aforesaid first, second, third, and fourth compartments are designated by the "a," "b," "c" and "d." In the compartment "d" is a tray 78 supported upon fixed angle iron members 80, the tray 78 being suitable for the support thereon of fruit, vegetables, or the like. In compartment "b," the dotted line showing indicates a soft drink bottle 82.

Operable and closable lids 84, 86, 88, and 90, extend over the upper ends of the compartments "a," "b," "c," and "d," respectively, and are hingedly connected to the adjacent portions of the enclosure top 34.

Upon the enclosure top 34 is a box 92 having a lid 94 thereon, the box 92 being suitable for the storage of cigarettes and matches therein and fabricated so as to be water-proof.

An open top box 96 is also positioned upon the top 34 and is suitable for storage therein of artificial lures and any other fishing equipment as found practical.

In use, the box 10 is easily carried by its handles 58 into and out of the storage compartment of an automobile and toward and away from the place where a fisherman intends to locate while fishing.

Air may be pumped into the enclosure 40 by the pump 36 and permitted to aerate the tank 30 by opening of the valve 50 and permitting some of the air to escape through the pipe 44 into the bottom of the tank 30. This will serve to keep minnows or other live bait in good condition until used.

Food may be stored in the compartment as above outlined, together with liquid refreshments and ice to keep the same in good condition.

A feature of the box 10 includes the total surrounding of the tank 30 by the enclosure 40 which isolates the water contained in the tank 30 from the other compartments and serves as insulation for the tank 30.

Using the box 10 of the present invention, with its attached parts and contained appurtenances, the fisherman will have all of his equipment and refreshment supplies at hand and in a single container easily transported and easily stored between periods of use.

What is claimed is:

1. A fishing apparatus comprising an open top box having a floor, a pair of side walls rising from the side edges of said floor, and an end wall rising from each end edge of said floor and connecting each of the adjacent ends of said side walls to the other, a second upstanding main partition positioned within said box inwardly of and spaced from one of said end walls and extending from one of said side walls to the other, a second upstanding main partition positioned within said box inwardly of and spaced from the other of said end walls and extending from one of said side walls to the other side wall, a first upstanding auxiliary partition positioned within said box inwardly of and spaced from said one side wall and extending from said first main partition to said second main partition, a second upstanding auxiliary partition positioned within said box inwardly of and spaced from said other side wall and extending from said first main partition to said second main partition, a tank having an open top and adapted to contain live fish bait fixedly positioned within and spaced from said main and auxiliary partitions, a top extending over the space between said main and auxiliary partitions and said tank and together with said tank, main and auxiliary partitions, and adjacent portions of said floor forming an enclosure, pump means extending into said enclosure for injecting air under pressure into said enclosure, and conduit means connecting the interior of said tank with the interior of said enclosure, the space between said first main partition, the adjacent end wall, and the adjacent side wall portions forming a storage compartment.

2. A fishing apparatus comprising an open top box having a floor, a pair of side walls rising from the side edges of said floor, and an end wall rising from each end edge of said floor and connecting each of the adjacent ends of said side walls together, a first upstanding main partition positioned within said box inwardly of and spaced from one of said end walls and extending from one of said side walls to the other, a second upstanding main partition positioned within said box inwardly of and spaced from the other of said end walls and extending from one of said side walls to the other side wall, a first upstanding auxiliary partition positioned within said box inwardly of and spaced from said one side wall and extending from said first main partition to said second main partition, a second upstanding auxiliary partition positioned within said box inwardly of and spaced from said other side wall and extending from said first main partition to said second main partition, a tank having an open top and adapted to contain live fish bait fixedly positioned within and spaced from said main and auxilary partitions, a top extending over the space between said main and auxiliary partitions and said tank and together with said tank, main and auxiliary partitions, and adjacent portions of said floor forming an enclosure, pump means extending into said enclosure for injecting air under pressure into said enclosure, and conduit means connecting the interior of said tank with the interior of said enclosure, the space between said first main partition, the adjacent end wall, and the adjacent side wall portions forming a first storage compartment, the space between said second main partition, the adjacent end wall, and the adjacent side wall portions forming a second storage compartment, and an openable and closable lid extending over the upper end of each of said first and second compartments.

3. A fishing apparatus comprising an open top box having a floor, a pair of side walls rising from the side edges of said floor, and an end wall rising from each end edge of said floor and connecting each of the adjacent ends of said side walls together, a first upstanding main partition positioned within said box inwardly of and parallel to and spaced from one of said end walls and extending from one of said side walls to the other, a second upstanding main partition positioned within said box inwardly of and parallel to and spaced from the other of said end walls and extending from one of said side walls to the other side wall, a first upstanding auxiliary partition positioned within said box inwardly of and parallel to and spaced from said one side wall and extending from said first main partition to said second main partition, a second upstanding auxiliary partition positioned within said box inwardly of and parallel to and spaced from said other side wall and extending from said first main partition to said second main partition, a tank having an open top and adapted to contain live fish bait fixedly positioned within and spaced from said main and auxiliary partitions, a top extending over the space between said main and auxiliary partitions and said tank and together with said tank, main and auxiliary partitions, and adjacent portions of said floor forming an enclosure, pump means extending into said enclosure for injecting air under pressure into said enclosure, and conduit means connecting the interior of said tank with the interior of said enclosure, the space between said first main partition, the adjacent end wall, and the adjacent side wall portions forming a first storage compartment, the space between said second main partition, the adjacent end wall, and the adjacent side wall portions forming a second storage compartment, the space between said first auxiliary partition, the adjacent portion of the adjacent side wall, and the adjacent parts of said first and second main partitions forming a third storage compartment, the space between said second auxiliary partition, the adjacent portion of the adjacent side wall, and the adjacent parts of said first and second main partitions forming a fourth storage compartment, and an openable and closable lid extending over the upper end of each of said first, second, third, and fourth compartments.

References Cited in the file of this patent

UNITED STATES PATENTS

| | | |
|---|---|---|
| 547,958 | McPherson | Oct. 15, 1895 |
| 913,379 | Hart | Feb. 23, 1909 |
| 1,926,162 | Moberly | Sept. 12, 1933 |
| 2,555,073 | Zdankoski | May 29, 1951 |
| 2,767,509 | Breithaupt | Oct. 23, 1956 |